US012797788B2

(12) United States Patent
Byeon et al.

(10) Patent No.: US 12,797,788 B2
(45) Date of Patent: Nov. 17, 2026

(54) ELECTRODE, MANUFACTURING METHOD THEREFOR, AND ELECTROSTATIC DISCHARGE SYSTEM COMPRISING SAME

(71) Applicant: Industry Academic Cooperation Foundation of Yeungnam University, Gyeongsangbuk-do (KR)

(72) Inventors: Jeong Hoon Byeon, Gyeongsangbuk-do (KR); Jae Ho Oh, Seoul (KR)

(73) Assignee: Industry Academic Cooperation Foundation of Yeungnam University, Gyeongsan-si (KR)

( * ) Notice: Subject to any disclaimer, the term of this patent is extended or adjusted under 35 U.S.C. 154(b) by 297 days.

(21) Appl. No.: 18/707,612

(22) PCT Filed: Jul. 26, 2022

(86) PCT No.: PCT/KR2022/010994
§ 371 (c)(1),
(2) Date: May 6, 2024

(87) PCT Pub. No.: WO2023/080389
PCT Pub. Date: May 11, 2023

(65) Prior Publication Data

US 2025/0196058 A1 Jun. 19, 2025

(30) Foreign Application Priority Data

Nov. 5, 2021 (KR) ........................ 10-2021-0151552
Jul. 26, 2022 (KR) ........................ 10-2022-0092795

(51) Int. Cl.
*B01D 53/32* (2006.01)
*C23F 1/00* (2006.01)

(52) U.S. Cl.
CPC ........ *B01D 53/32* (2013.01); *B01D 2259/818* (2013.01); *C23F 1/00* (2013.01)

(58) Field of Classification Search
CPC ...... B01D 53/32; B01D 2259/818; C23F 1/00
See application file for complete search history.

(56) References Cited

U.S. PATENT DOCUMENTS

2006/0197018 A1 9/2006 Chen
2023/0256386 A1* 8/2023 Koh ........................ B01D 53/32 96/15
2024/0387791 A1* 11/2024 Byeon ........................ B03C 3/41

FOREIGN PATENT DOCUMENTS

EP 4393599 7/2024
JP 2001-046908 2/2001
(Continued)

OTHER PUBLICATIONS

Machine translation of JP 2001-046908 (Year: 2001).*
(Continued)

*Primary Examiner* — Robert Clemente

(57) ABSTRACT

The present application relates to an electrode, a manufacturing method therefor, and an electrostatic discharge system comprising same, the electrode comprising: a body; and a plurality of nano-sized first protrusions formed on the surface of the body, wherein the electrode has a concentration of generated anions of at least 15×105 ions/cm3, the concentration of generated anions being measured by supplying air by a flow rate of 5 L/min and applying a 7 kV DC negative voltage. The present invention has an excellent concentration of generated anions and may maintain a residual ozone concentration which is equal to or lower than an indoor standard.

12 Claims, 13 Drawing Sheets

(56) References Cited

FOREIGN PATENT DOCUMENTS

| | | |
|---|---|---|
| JP | 2004-342528 | 12/2004 |
| KR | 10-2005-0098567 | 10/2005 |
| KR | 10-2007-0075047 | 7/2007 |
| KR | 10-2013-0109344 | 10/2013 |
| KR | 10-2019-0021608 | 3/2019 |
| KR | 10-2019-0131261 | 11/2019 |
| KR | 10-2020-0024993 | 3/2020 |

OTHER PUBLICATIONS

International Search Report and the Written Opinion Dated Nov. 22, 2022 From the International Searching Authority Re. Application No. PCT/KR2022/010994 and Its Translation of Search Report Into English. (10 Pages).

Supplementary European Search Report and the European Search Opinion Dated Oct. 7, 2025 From the European Patent Office Re. Application No. 22890125.2. (15 Pages).

* cited by examiner (a) (b)

(a) (b)

(a) (b)

ELECTRODE, MANUFACTURING METHOD THEREFOR, AND ELECTROSTATIC DISCHARGE SYSTEM COMPRISING SAME

RELATED APPLICATIONS

This application is a National Phase of PCT Patent Application No. PCT/KR2022/010994 having International filing date of Jul. 26, 2022, which claims the benefit of priority of Republic of Korea Patent Application Nos. 10-2022-0092795 filed on Jul. 26, 2022 and 10-2021-0151552 filed on Nov. 5, 2021. The contents of the above applications are all incorporated by reference as if fully set forth herein in their entirety.

FIELD AND BACKGROUND OF THE INVENTION

The present application relates to an electrode, a method of manufacturing the electrode, and an electrostatic discharge system including the electrode.

Electrostatic discharge technology for improving indoor air quality has been mainly used to replace a high efficiency particulate air (HEPA) filter shown in FIG. 1 using electric dust collection or to overcome the shortcomings of local ultraviolet (UV) sterilization shown in FIG. 2 using anion generation. In particular, new approaches to electrostatic discharge technology are needed to innovatively control bio-fine dust, which accounts for one-third of indoor airborne pollutants.

In the case of electrostatic discharge technology, it is essential to design a differentiated electrostatic discharge system in order to maintain a residual ozone concentration of an indoor reference value or less. Accordingly, there is a need for an electrode that can exhibit the above-described effects, a method of manufacturing the electrode, and an electrostatic discharge system including the electrode.

SUMMARY OF THE INVENTION

Technical Problem

An objective of the present application is directed to providing an electrode that has an excellent anion generation concentration and maintains a residual ozone concentration of an indoor reference value or less, a manufacturing method of the electrode, and an electrostatic discharge system including the electrode.

Technical Solution

The present application relates to an electrode. According to an exemplary electrode of the present invention, an anion generation concentration is excellent and a residual ozone concentration can be maintained at an indoor reference value or less.

In the present specification, the term "nano" may refer to a size in a unit of nanometer (nm), for example, 0.1 nm to 1,000 nm, but the present invention is not limited thereto. In addition, in the present specification, the term "nano-pin" refers that a protrusion with an average diameter in a unit of nm is formed on a surface of a pin-shaped body. In addition, in the present specification, "pin" may refer to a rod-shaped structure with a larger length compared to a cross-sectional area, and a diameter becoming smaller toward an end portion, giving it a pointed shape.

Hereinafter, an electrode of the present application will be described with reference to the accompanying drawings. The accompanying drawings are illustrative, and the electrode of the present invention is not limited to the accompanying drawings.

FIG. 3 is a diagram illustrating an electrode according to one embodiment of the present application. As shown in FIG. 3, the electrode includes a body 11 and a first protrusion 12.

The body 11 is a portion that becomes a body of the electrode.

In one example, the body may have a pin shape. Since the electrode body has a pin shape, when anions are generated, an active area may expand and, simultaneously, an ionization discharge onset voltage for anion generation may be lowered to suppress ozone generation.

The body 11 may be made of an electrode material commonly used in the art. Specifically, the body 11 may include a transition metal selected from the group consisting of: iron, tungsten, silver, copper, gold, nickel, cobalt, zinc, molybdenum, and an alloy thereof.

The first protrusion 12 is a portion that protrudes from a surface of the body 11, is formed as a plurality of first protrusion 12 on the surface of the body 11, and may have a nano size. Since the electrode has the plurality of nano-sized first protrusions on the surface of the body, an ionization discharge onset voltage required for generating anions is lowered, and when anions are generated, the anions distributed on the surface of the body and the first protrusions are dispersed, an amount of impact, which is reduced by a low electron transfer speed generated due to the dispersed anions, causes outer electrons of an oxygen atom to escape mainly rather than oxygen dissociation so that ozone generation can be suppressed and a phenomenon of increasing an amount of anion generation can be induced. In addition, due to the above description, the electrode may maintain a residual ozone concentration of an indoor reference value or less. In the present specification, the term "plurality" refers to two or more, and an upper limit thereof is not particularly limited.

In one example, the first protrusion 12 may have a radius curvature ranging from 1 nm to 10 μm. Specifically, the radius curvature of the first protrusion 12 may range from 5 nm to 8 μm, from 10 nm to 6 μm, from 50 nm to 4 μm, or from 100 nm to 2 μm. The radius curvature may be measured through a high-magnification image (×10000 or more) captured using a scanning electron microscope. Since the first protrusion 12 has the radius curvature in the above-described ranges, the ionization discharge onset voltage for anion generation may be lowered, and in this way, an electric field intensity may be lowered to suppress ozone generation.

For example, in the electrode, an ionization discharge onset voltage for anion generation may range from 0.02 kV to 20 kV, specifically, from 0.05 kV to 18 kV, from 0.1 kV to 15 kV, from 0.5 kV to 13 kV, or from 1 kV to 10 kV. In the electrode, the ionization discharge onset voltage for anion generation satisfies the above-described ranges so that an electric field strength may be lowered to suppress ozone generation.

In this case, the ionization discharge onset voltage Vs for anion generation may be calculated using the following general equation 1.

$$V_s = \frac{r}{2} \times E \times \ln\left[\frac{r+2d}{r}\right] \quad \text{[General Equation 1]}$$

In General Equation 1, r denotes the radius curvature of the first protrusion, E denotes an electric field strength when ionization begins to appear on the surfaces of the body and the first protrusion to generate anions, and d denotes a distance between the electrode and a ground. In this case, the electric field strength E may be calculated by substituting the ionization discharge onset voltage Vs obtained through an actual experiment, the radius curvature r of the protrusion, which is specified in advance, and the distance d between the electrode and the ground.

The distance d between the electrode and the ground may range from 4 mm to 16 mm in the air, and specifically, a lower limit may be 6 mm or more, 8 mm or more, or 10 mm or more, and the upper limit may be 14 mm or less or 12 mm or less. When the distance between the electrode and the ground satisfies the above-described ranges, a voltage applied for anion generation is lowered so that the electric field strength may be lowered to suppress ozone generation. However, when the distance between the electrode and the ground exceeds the above-described ranges, a voltage applied for anion generation increases, resulting in shortcomings of increasing the electric field strength and the ozone generation.

In one example, the first protrusion 12 is integrated with the body 11 through a first forming operation, which will be described below, and may be made of the same material as the body 11. For example, the first protrusion 12 may include a transition metal selected from the group consisting of: iron, tungsten, silver, copper, gold, nickel, cobalt, zinc, molybdenum, and an alloy thereof.

An anion generation concentration, which is measured while supplying air to the electrode at a flow rate of 5 L/min, may be $15\times10^5$ ions/$cm^3$ or more. A specific method of measuring the anion generation concentration of the electrode may be performed to measure an anion generation concentration generated by applying a DC negative voltage, for example, a DC negative voltage of 7 kV, while supplying air at the above-described flow rate through an anion measurement part, specifically, an air ion meter, installed to be spaced a predetermined distance, e.g., 3.5 cm in one example, from the electrode. In addition, the anion generation concentration of the electrode measured in the above-described condition may be, specifically, $18\times10^5$ ions/$cm^3$ or more, $20\times10^5$ ions/$cm^3$ or more, $25\times10^5$ ions/$cm^3$ or more, $30\times10^5$ ions/$cm^3$ or more, or $33\times10^5$ ions/$cm^3$ or more. In addition, an upper limit of the anion generation concentration of the electrode measured in the above-described condition may be $1\times10^8$ ions/$cm^3$ or less, $5\times10^7$ ions/$cm^3$ or less, $1\times10^7$ ions/$cm^3$ or less, $5\times10^6$ ions/$cm^3$ or less, $45\times10^5$ ions/$cm^3$ or less, or $43\times10^5$ ions/$cm^3$ or less. The anion generation concentration of the electrode measured in the above-described condition satisfies the above-described ranges so that the anion generation concentration may be excellent, and a residual ozone concentration can be maintained at an indoor reference value or less.

In another example, when anions are generated in the electrode in the above-described condition, the residual ozone concentration may be less than 70 ppb, specifically, 65 ppb or less, 60 ppb or less, 55 ppb or less, 50 ppb or less, 45 ppb or less, or 40 ppb or less. When the anions are generated in the electrode in the above-described condition, the electrode has a residual ozone concentration in the above-described ranges so that the residual ozone concentration can be maintained at the indoor reference value or less.

In addition, an electric field applied when the anions are generated in the electrode in the above-described condition may range 500 V/m to 500,000 V/m. Specifically, the electric field applied when the anions are generated in the electrode in the above-described condition may range from 1000 V/m to 300000 V/m or from 5000 V/m to 200000 V/m. Since the electrode generates the anions with the electric field in the above-described range, the anion generation concentration is excellent and the residual ozone concentration may be maintained at the indoor reference value or less.

In one example, the electrode may further include second protrusions 13. FIG. 4 is an exemplary diagram illustrating an electrode according to another embodiment of the present application. As shown in FIG. 4, the second protrusions 13 may be further included between the plurality of first protrusions 12 formed on the surface of the body 11. The electrode further includes the second protrusions so that a surface for anion generation may be increased.

For example, the second protrusion 13 may be made of conductive metal particles. Specifically, a transition metal selected from the group consisting of: iron, tungsten, silver, copper, gold, nickel, cobalt, zinc, molybdenum, and an alloy thereof may be used as the conductive metal particle.

In addition, in the second protrusion, a size of the conductive metal particle may be a nano size. Since the conductive metal particle has a nano size, an active area when anions are generated may increase. On the other hand, when the size of the second protrusion exceeds the nano size, an area covering the body and the first protrusion increases so that anion generation may be suppressed.

The present application also relates to a method of manufacturing an electrode. The method of manufacturing an electrode relates to a method of manufacturing the above-described electrode, and detailed contents regarding the electrode, which will be described below, may be applied in the same manner as those described in the electrode.

The method of manufacturing an electrode includes a first forming operation.

The first forming operation is an operation of forming an electrode and is performed by forming a plurality of nano-sized first protrusions on the surface of the body. Since the plurality of nano-sized first protrusions are formed on the electrode, an ionization discharge onset voltage for anion generation may be lowered, and in this way, an electric field intensity may be lowered to suppress ozone generation.

In one example, the first forming operation may be performed through etching. Specifically, the etching may be performed by one or more selected from wet etching, optical etching, and physical etching. The first forming operation is performed by the above-described etching so that the first protrusion may be formed on the surface of the body in a simplified process.

In one example, wet etching may be used as the first forming operation. The wet etching may be performed by impregnating the body with an etching solution and then applying ultrasound. Since the wet etching is used in the first forming operation, easiness of the process can be achieved and thus manufacturing costs can be reduced.

For example, due to easiness of application, a low price, and stable performance, a single or mixed solution based on strong acids such as HCl, $H_2SO_2$, and HF; or strong base such as NaOH, and potassium hydroxide is used as the etching solution, and a commercially available etching solution such as a tungsten etching solution, a stainless etching solution, or a nickel etching solution may be used.

In addition, an ultrasound application time may range from 10 seconds to one hour. Specifically, the ultrasound application time may range from 20 seconds to 45 minutes, from 30 seconds to 30 minutes, from 40 seconds to 15 minutes, from 1 minute to 10 minutes, or from 1 minute to 5 minutes. When the ultrasonic application time during the wet etching satisfies the above-described ranges, an electrode having an excellent anion generation concentration and maintaining a residual ozone concentration at an indoor reference value or less may be manufactured.

In another example, photolithography or laser lithography may be used as the optical etching. FIGS. 5 to 10 show another example and exemplary diagrams illustrating an electrode manufactured using a laser lithography process. As shown in FIGS. 5 to 10, the electrode may have a structure in which typical first protrusions 12 of various shapes are formed on a body (not shown).

In another example, the method manufacturing an electrode may further include a second forming operation. FIG. 11 is an exemplary diagram illustrating the second forming operation according to another embodiment. As shown in FIG. 11, the second forming operation is an operation of forming second protrusions 13 between the plurality of first protrusions 12 formed on the surface of the body 11, and the second protrusions 13 may be formed between the plurality of first protrusions 12 by impregnating the electrode on which the plurality of first protrusions 12 are formed on the body 11 through the first formation operation with a solution 1 in which conductive metal particles are dispersed to attach the second protrusions 13 between the plurality of first protrusions 12. The method of manufacturing an electrode further includes the second forming operation so that a surface for anion generation may be increased. The detailed description of the second protrusion is the same as that described in the second protrusion, and thus it will be omitted.

The electrode manufactured by the above-described method may have an anion generation concentration of $15\times10^5$ ions/cm$^3$ measured by applying a DC negative voltage of 7 kV while supplying air at a flow rate of 5 L/min. The detailed description of the anion generation concentration of the electrode measured in the above-described conditions is the same as described above, and thus it will be omitted. The anion generation concentration of the electrode measured in the above-described condition satisfies the above-described ranges so that the anion generation concentration may be excellent, and a residual ozone concentration can be maintained at an indoor reference value or less.

The present application also relates to an electrostatic discharge system. The electrostatic discharge system relates to an electrostatic discharge system including the above-described electrode, and detailed contents regarding the electrode, which will be described below, may be applied in the same manner as those described in the electrode.

The electrostatic discharge system includes the above-described electrode. Since electrostatic discharge system includes the above-described electrode, an anion generation concentration is excellent and a residual ozone concentration can be maintained at an indoor reference value or less. Other configurations of the electrostatic discharge system can be those commercially available in the art and are not particularly limited as long as they include the above-described electrode.

Advantageous Effects

According to an electrode, a manufacturing method of the electrode, and an electrostatic discharge system including the electrode of the present application, an anion generation concentration is excellent and a residual ozone concentration can be maintained at an indoor reference value or less.

DESCRIPTION OF SPECIFIC EMBODIMENTS OF THE INVENTION

Hereinafter, the above-described content will be described in more detail through examples and comparative examples, but the scope of the present application is not limited by contents described below.

Example 1. Manufacturing of Electrode

Figure 1:
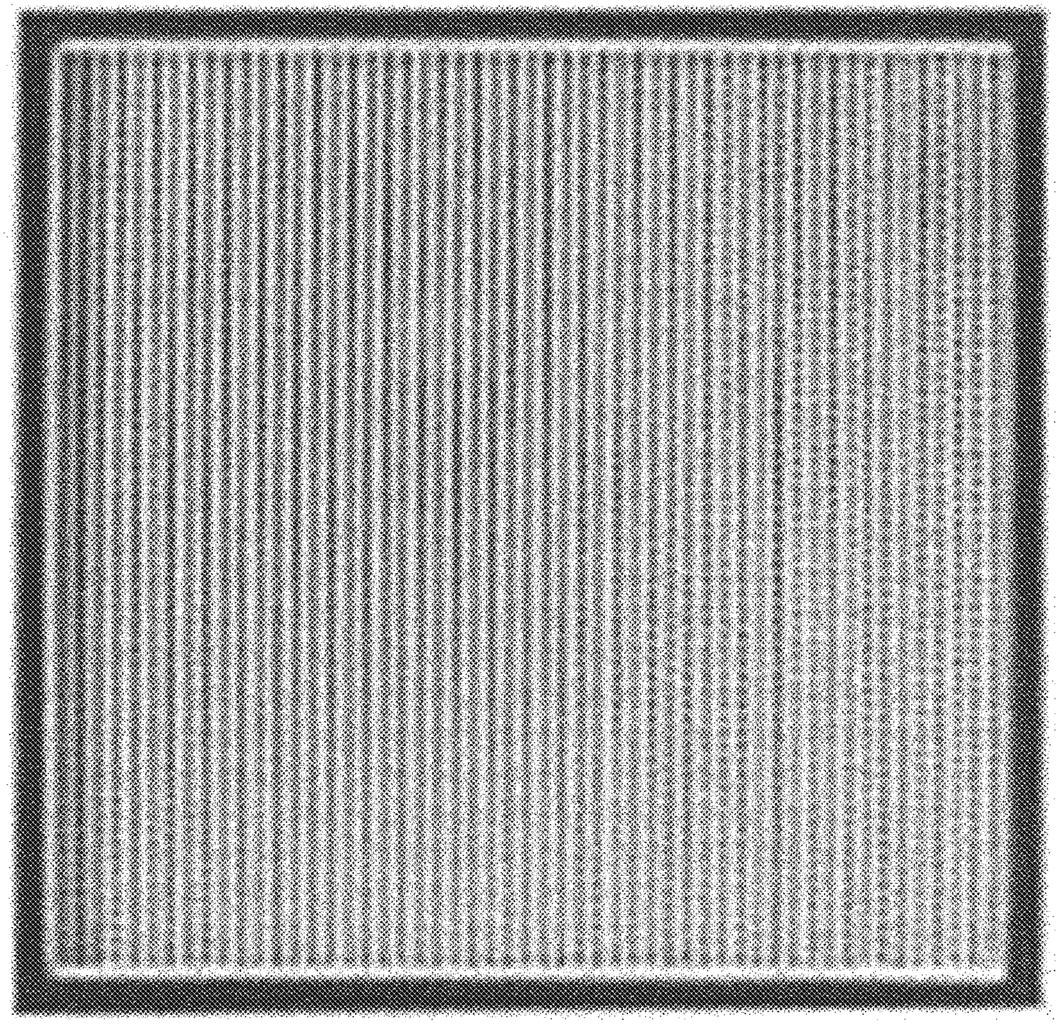
FIG. 1 is a diagram illustrating a high efficiency particulate air (HEPA) filter included in a conventional electrostatic system.
Figure 2:
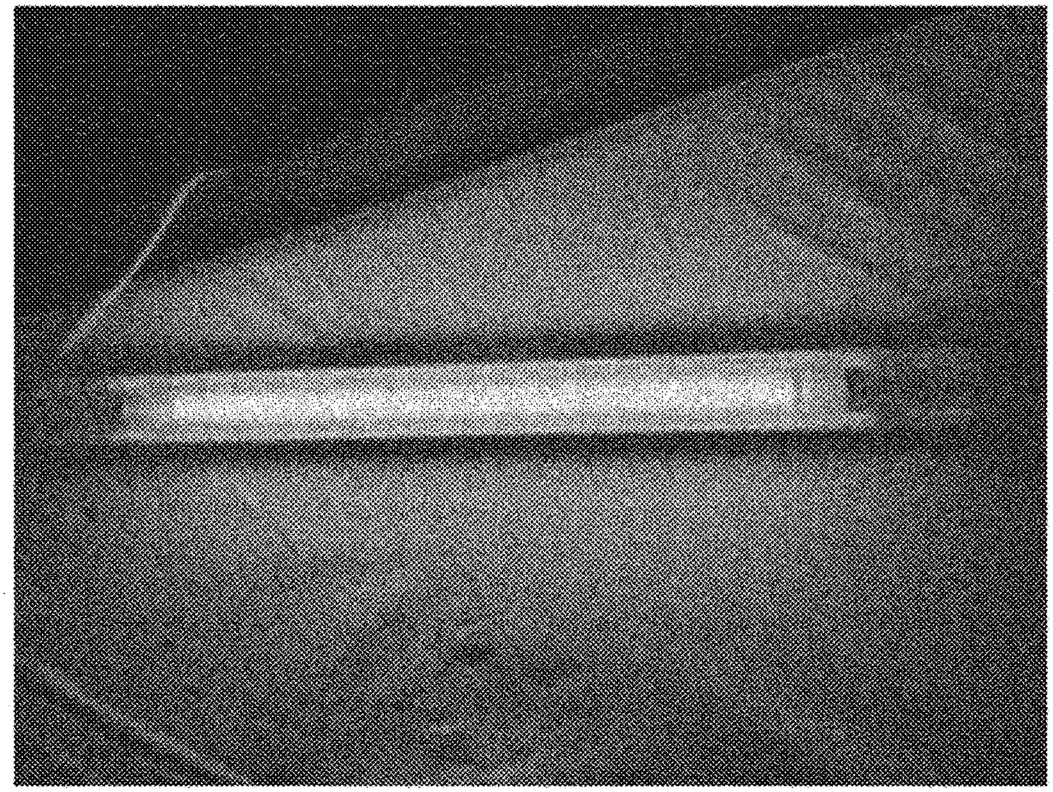
FIG. 2 is a diagram illustrating an ultraviolet (UV) sterilizer included in the conventional electrostatic system.
Figure 3:
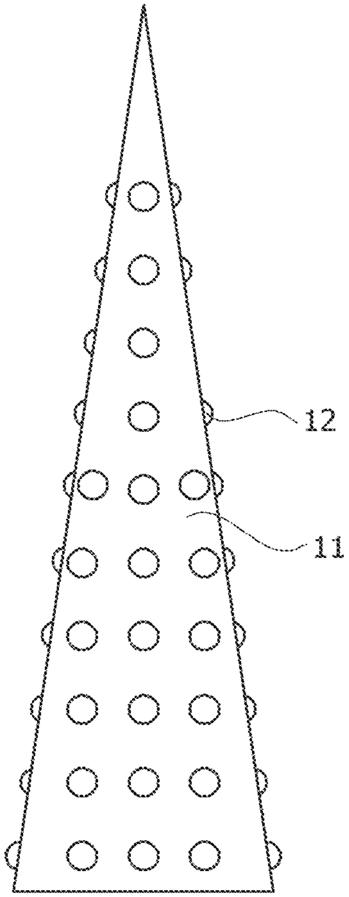
FIG. 3 is a diagram illustrating an electrode according to one embodiment of the present application.
Figure 4:
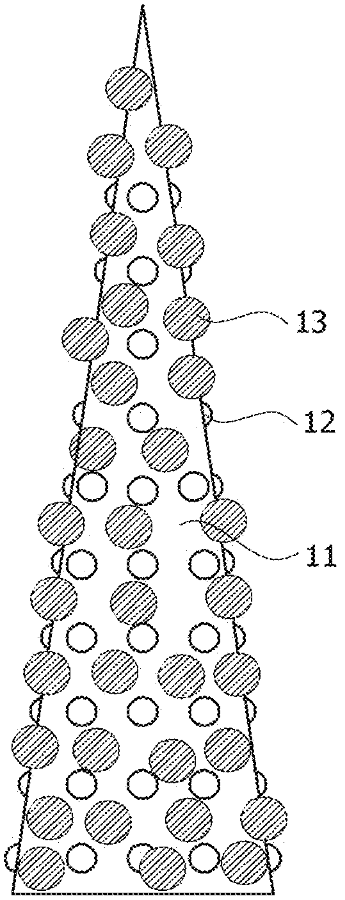
FIG. 4 is an exemplary diagram illustrating an electrode according to another embodiment of the present invention.
Figure 5:
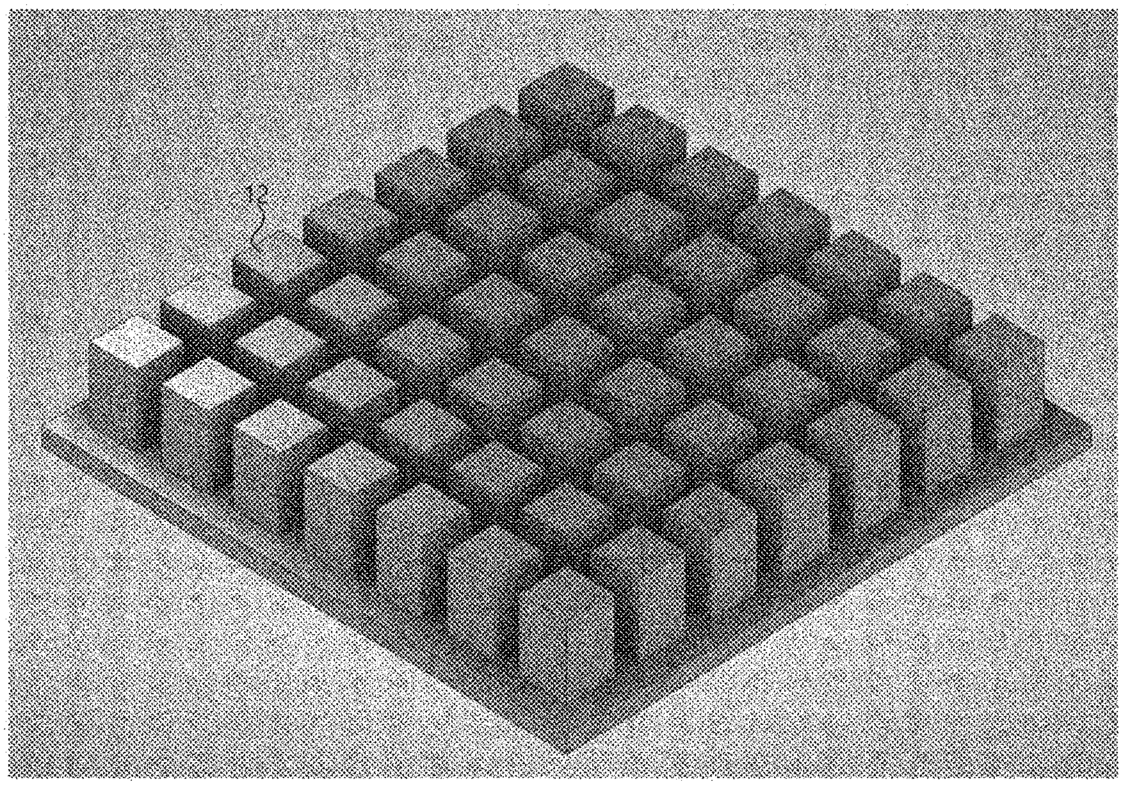
FIGS. 5 to 10 show another example and exemplary diagrams illustrating an electrode manufactured using a laser lithography process.
Figure 6:
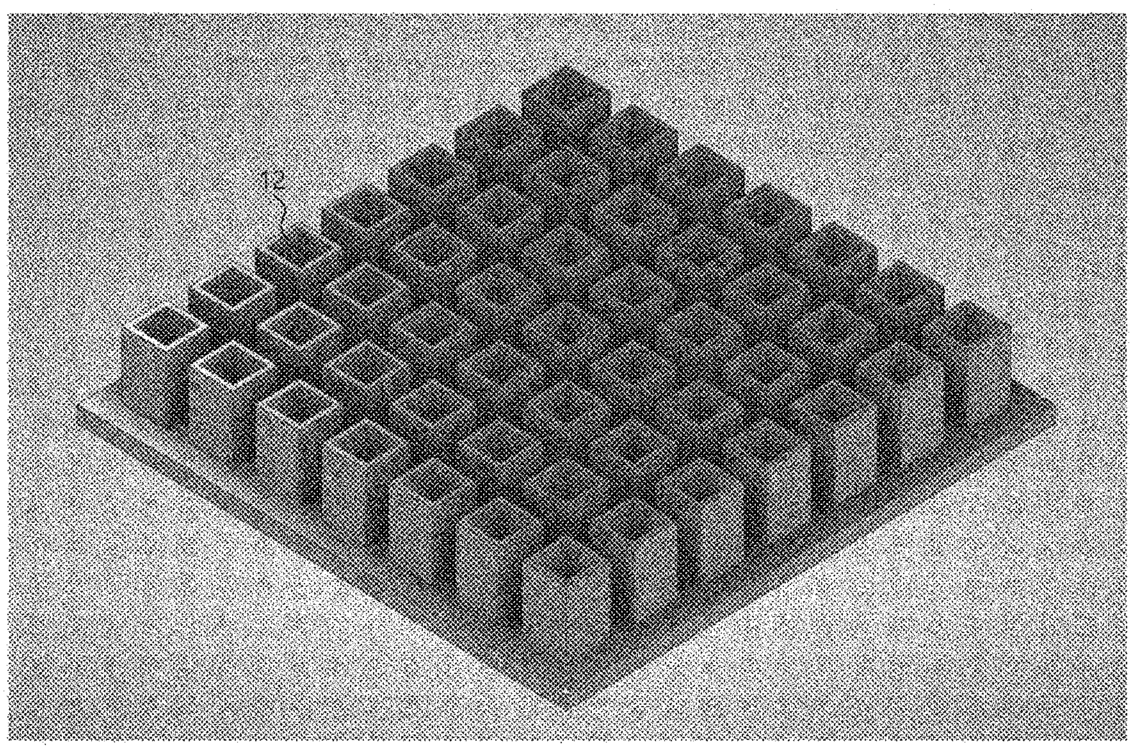
Figure 7:
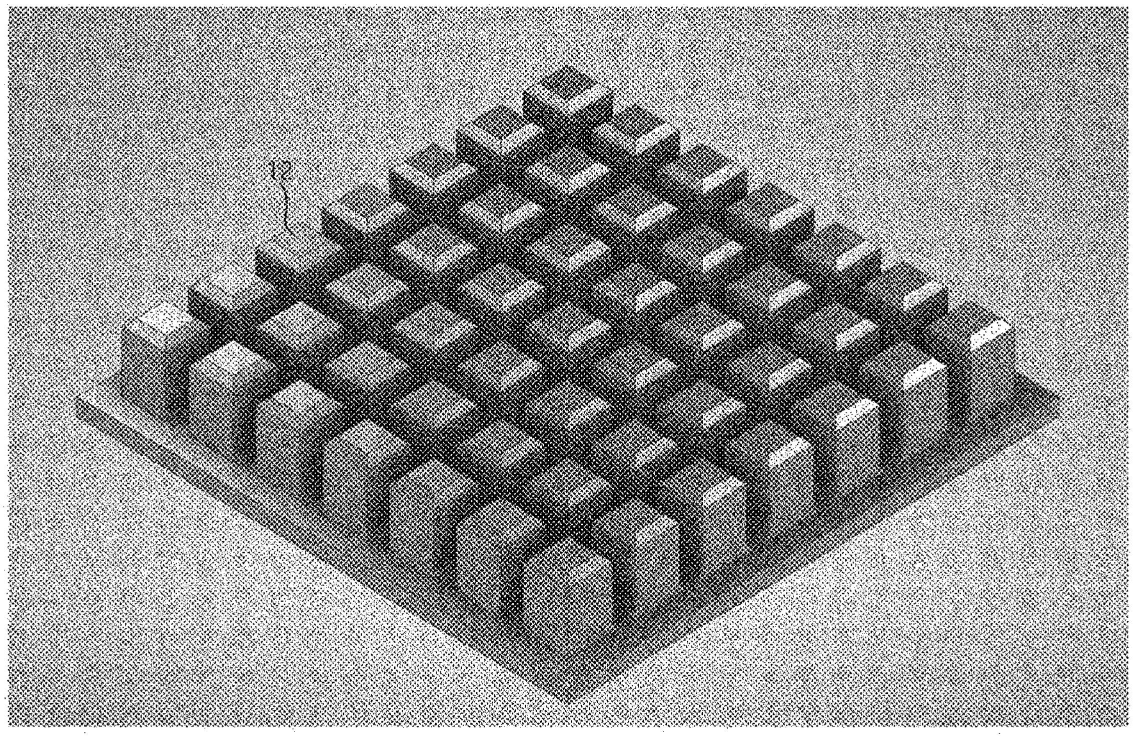
Figure 8:
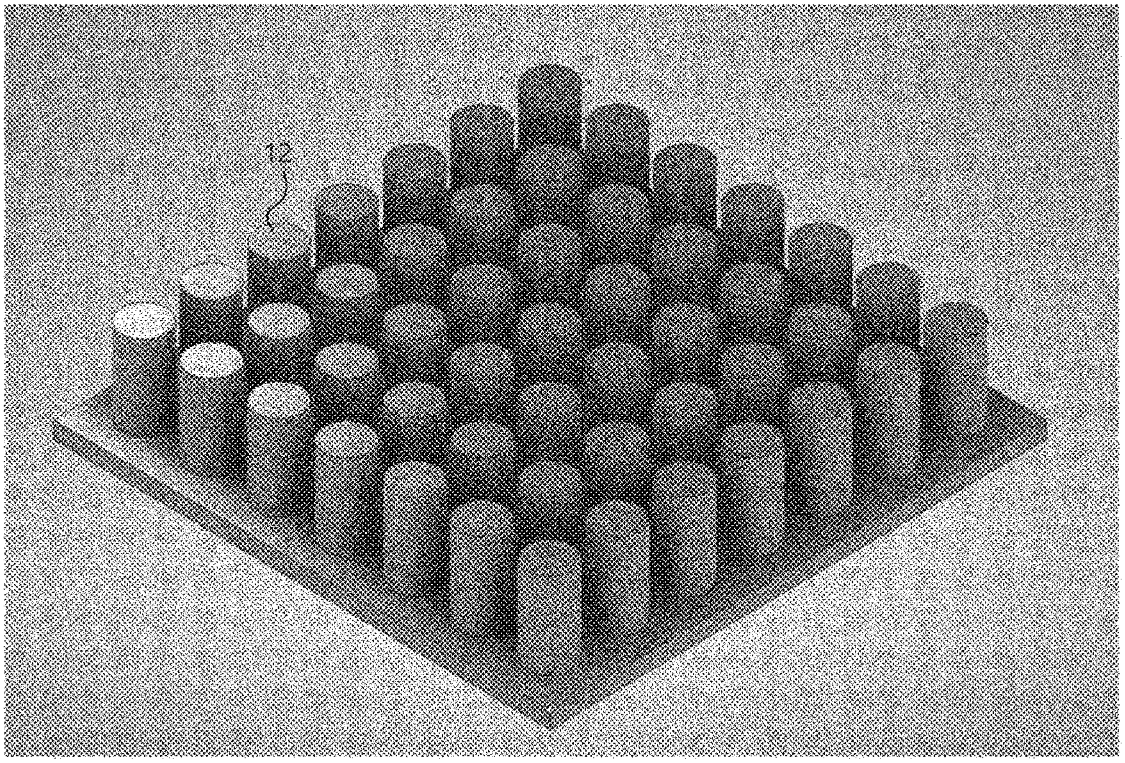
Figure 9:
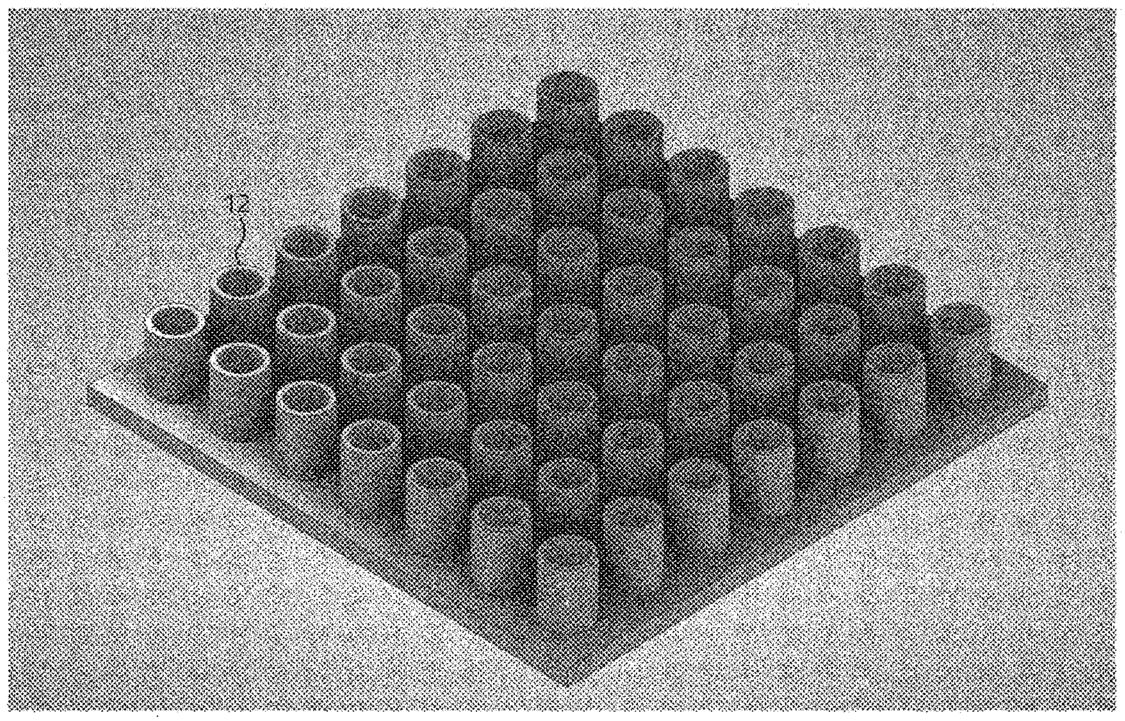
Figure 10:
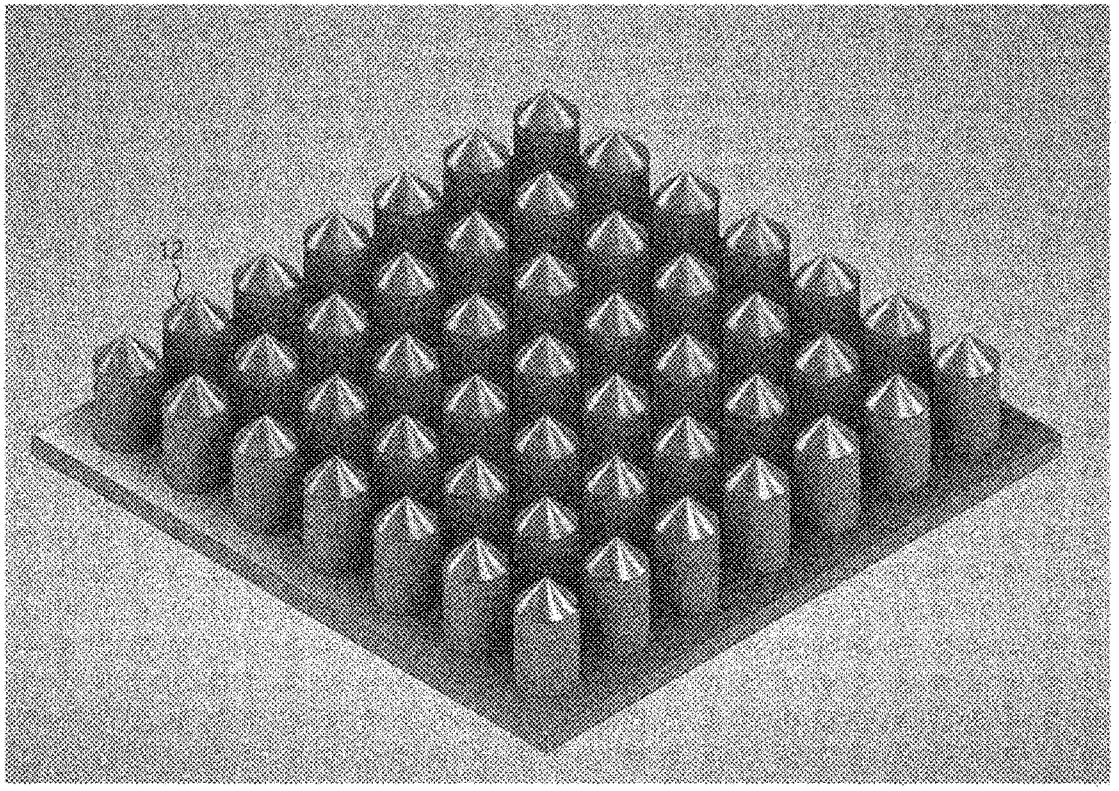
Figure 11:
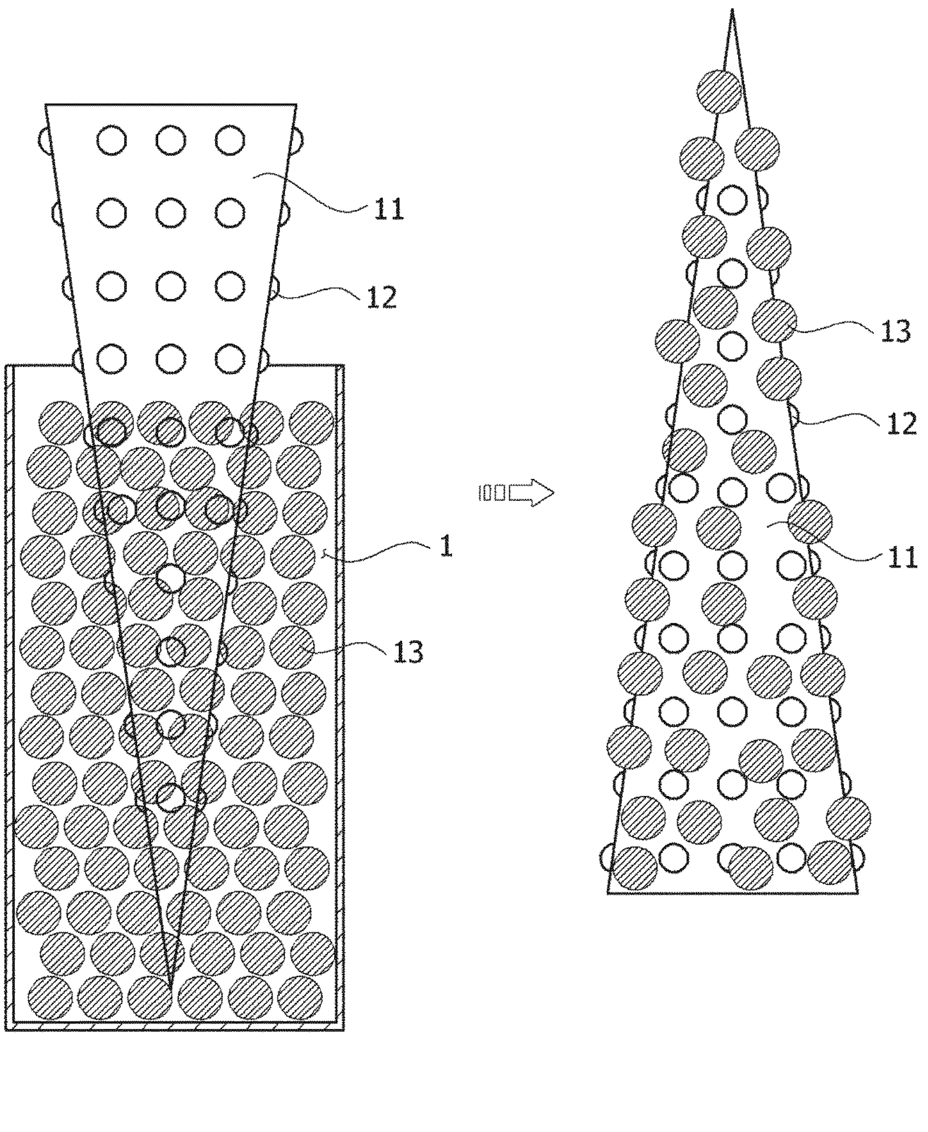
FIG. 11 is an exemplary diagram illustrating the second forming operation according to another embodiment.
Figure 12:
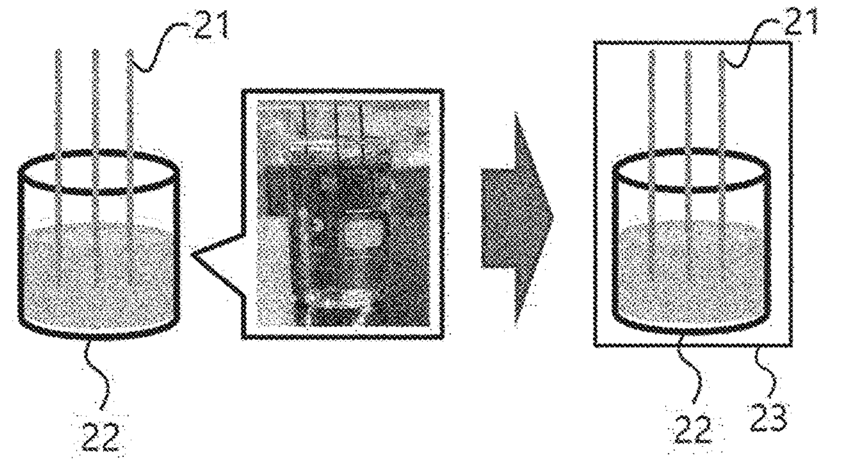
FIG. 12 is a diagram illustrating an exemplary device for manufacturing an electrode according to one embodiment of the present application.
Figure 13:
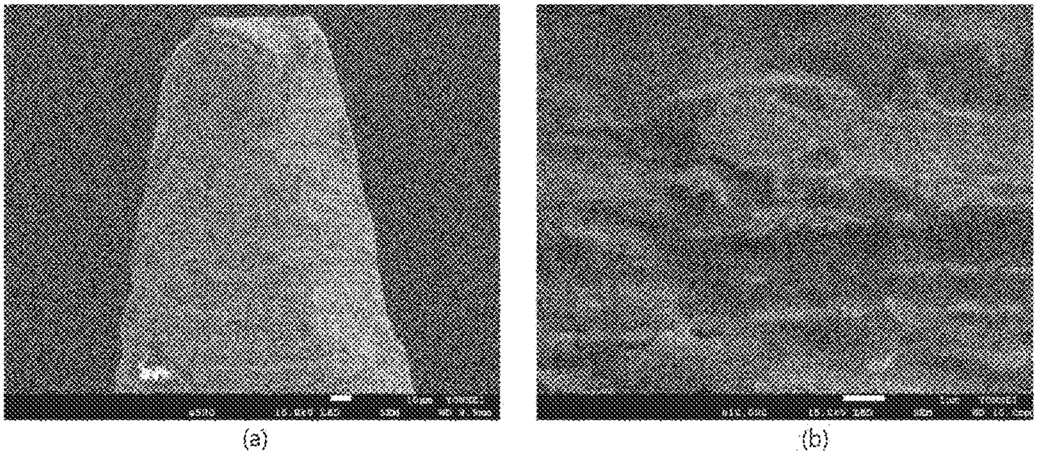
FIG. 13 shows a low-magnification image (a, ×500) and a high-magnification image (b, ×10000), which are captured using a scanning electron microscope for an electrode manufactured in Example 1.
Figure 14:
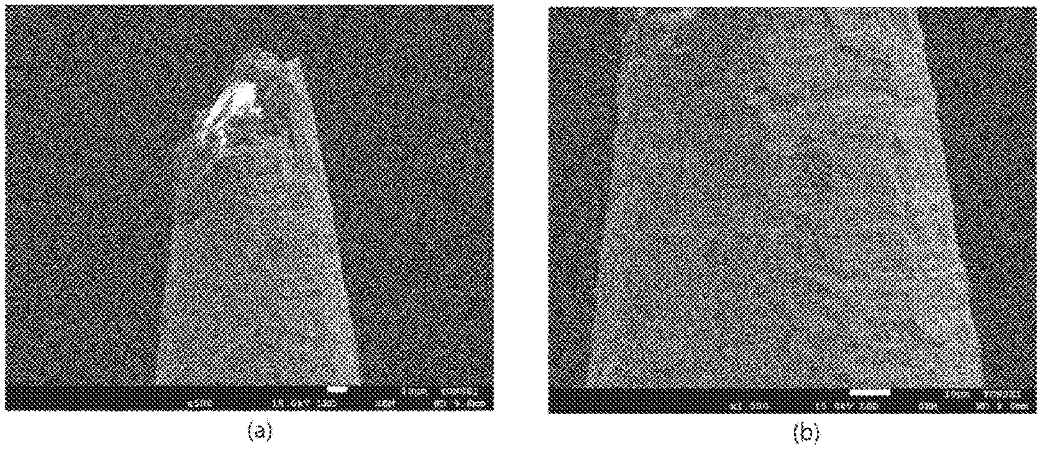
FIG. 14 shows a low-magnification image (a, ×500) and a high-magnification image (b, ×10000), which are captured using the scanning electron microscope for an electrode manufactured in Example 3.
Figure 15:
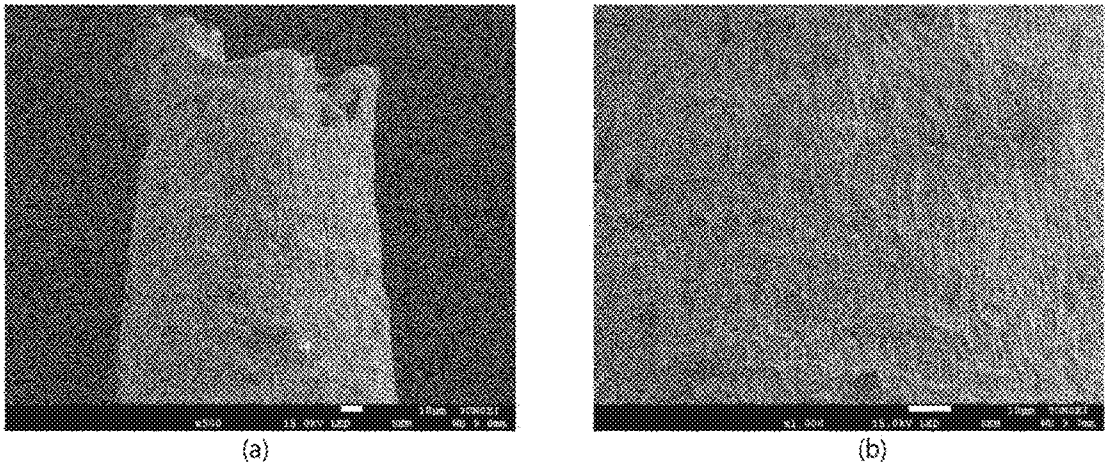
FIG. 15 shows a low-magnification image (a, ×500) and a high-magnification image (b, ×10000), which are captured using the scanning electron microscope for an electrode manufactured in Example 5.
Figure 16:
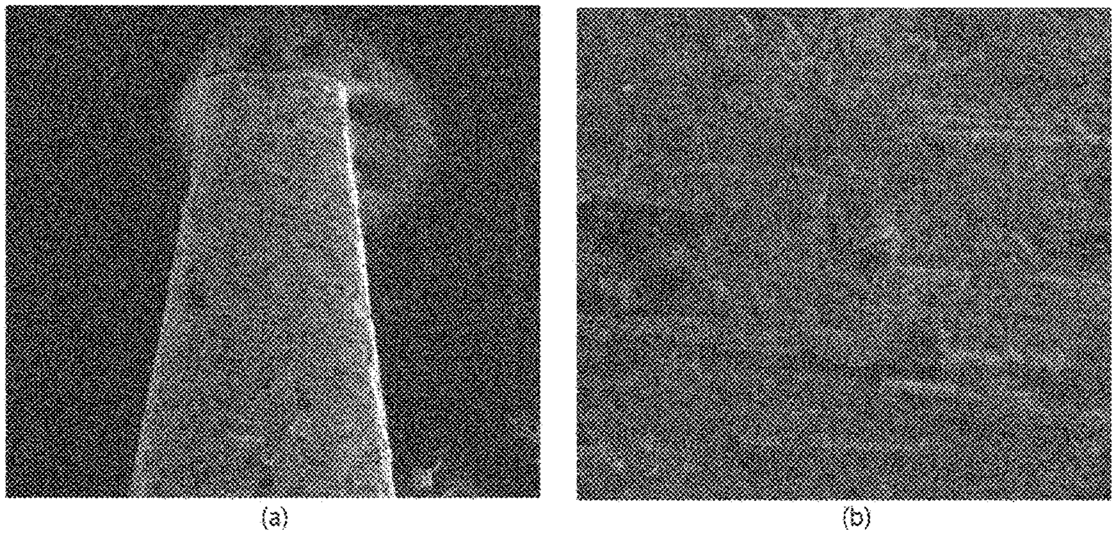
FIG. 16 shows a low-magnification image (a, ×500) and a high-magnification image (b, ×10000), which are captured using the scanning electron microscope for an electrode prepared in Comparative Example 1.
Figure 22:
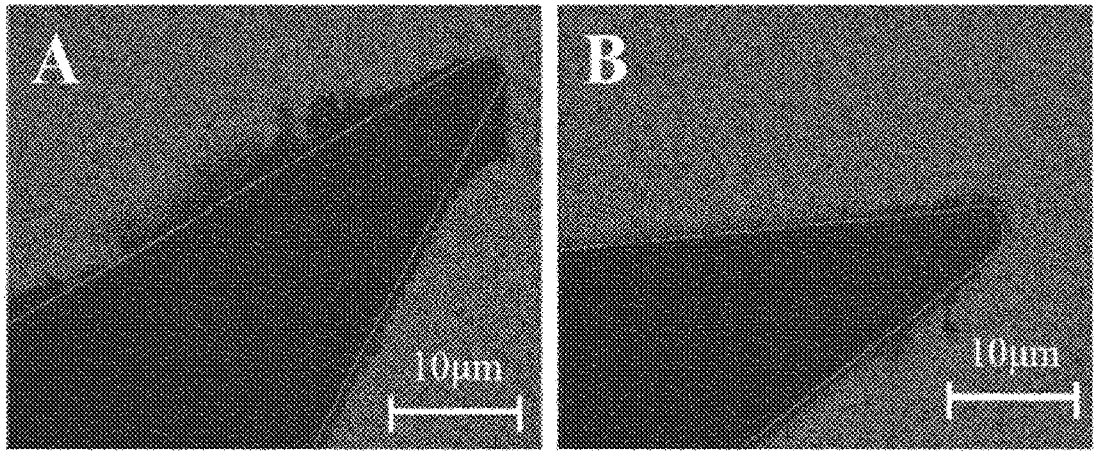
FIG. 22 shows low-magnification images (×500) of the first protrusion of the electrode manufactured in Example 1, which are captured using a scanning electron microscope.

FIG. 12 is a diagram illustrating an exemplary device for manufacturing an electrode according to one embodiment of the present application. An electrode was manufactured using the device shown in FIG. 12. Specifically, nano-pin-type electrodes 21 containing tungsten (Tungsten Pin, American Elements Company) were impregnated with an etching solution (667498, Sigma-Aldrich Co. Ltd.) contained in a beaker 22, the beaker 22 was immersed in an ultrasonic bath 23 filled with water, ultrasound was generated for one minute, and an electrode in which first protrusions were formed on a surface of a body was manufactured. In this case, a radius curvature of the first protrusion may be 2 μm or less. In addition, a low-magnification image (×500) of the first protrusions of the electrode manufactured in Example 1 was captured using a scanning electron microscope (SEM) (S-4800, Hitachi, Japan), and the results are shown in FIG. 22.

Example 2. Manufacturing of Electrode

An electrode was manufactured in the same manner as in Example 1, except that a nano-pin-type electrode containing tungsten was impregnated with an etching solution contained in a beaker, ultrasound was generated for two minutes, and first protrusions were formed on the surface of the body. In this case, a radius curvature of the first protrusion may be 1 μm or less.

Example 3. Manufacturing of Electrode

An electrode was manufactured in the same manner as in Example 1, except that a nano-pin-type electrode containing tungsten was impregnated with an etching solution contained in a beaker, ultrasound was generated for three minutes, and first protrusions were formed on the surface of the body. In this case, a radius curvature of the first protrusion may be 500 nm or less.

Example 4. Manufacturing of Electrode

An electrode was manufactured in the same manner as in Example 1, except that a nano-pin-type electrode containing tungsten was impregnated with an etching solution contained in a beaker, ultrasound was generated for four minutes, and first protrusions were formed on the surface of the body. In this case, a radius curvature of the first protrusion may be 300 nm or less.

Example 5. Manufacturing of Electrode

An electrode was manufactured in the same manner as in Example 1, except that a nano-pin-type electrode containing tungsten was impregnated with an etching solution contained in a beaker, ultrasound was generated for five minutes, and first protrusions were formed on the surface of the body. In this case, a radius curvature of the first protrusion may be 100 nm or less.

Comparative Example 1. Preparation of Electrode

A pin-type electrode containing tungsten, on which first protrusions were not formed, was prepared. In this case, the electrode prepared in Comparative Example 1 does not include the first protrusions, and a radius curvature of a pointed portion at an upper end of the body may be 100 μm.

Experimental Example 1. Evaluation of Surface Shape and Composition of Electrode Surface shapes of the electrodes manufactured in Examples 1, 3, and 5 and the electrode prepared in Comparative Example 1 were captured as low and high magnification images using a SEM (S-4800, Hitachi, Japan), and the results were shown in FIGS. 13 to 16.

Figure 17:
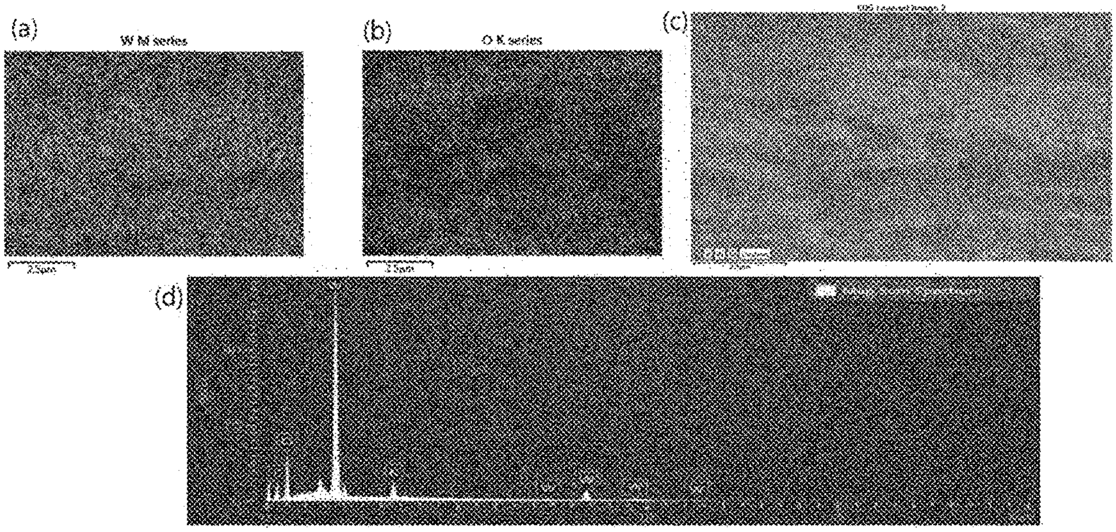
FIG. 17 shows elemental map images (a, b, c) of energy dispersive X-ray spectroscopy and a graph (d) for the electrode manufactured in Example 1.
Figure 18:
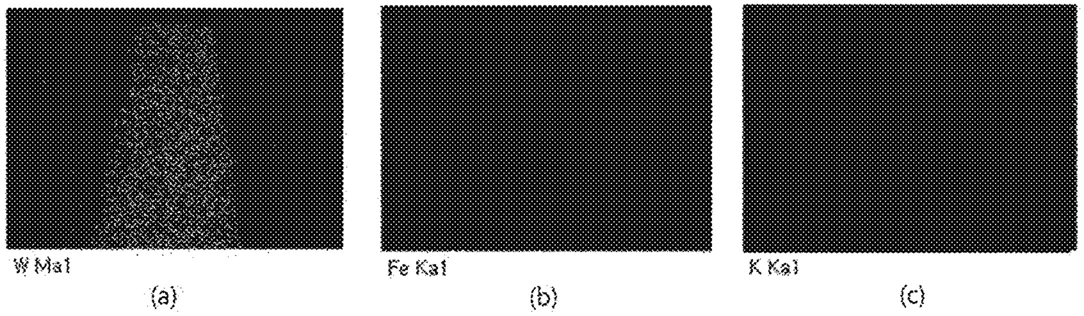
FIG. 18 shows elemental map images of an energy dispersive X-ray spectrometer for W (a), Fe (b), and K (c), respectively, for the electrode prepared in Comparative Example 1.

In addition, compositions of the electrode manufactured in Example 1 and the electrode prepared in Comparative Example 1 were observed using an energy dispersive X-ray spectrometer (EDX) (S-4800, Hitachi, Japan), and the results were shown in FIGS. 17 and 18 and the following Table 1. In this case, by using a carbon tape for fixing the electrode manufactured in Example 1 and the electrode prepared in Comparative Example 1, a carbon content includes a content of the carbon tape. In addition, contents of oxygen and potassium are due to an etching process.

TABLE 1

| | Example 1 | Comparative Example 1 |
|---|---|---|
| W | 71.18 wt % | 100 wt % |
| C | 8.23 wt % | 0 wt % |
| O | 16.70 wt % | 0 wt % |
| Fe | 0 wt % | 0 wt % |
| K | 3.89 wt % | 0 wt % |

As shown in FIGS. 13 to 16 and Table 1, it was confirmed that the electrodes manufactured in Examples 1, 3, and 5 had nano-sized first protrusions formed on the surface of the nano-pin-type body compared to the electrode prepared in Comparative Example 1.

Figure 19:
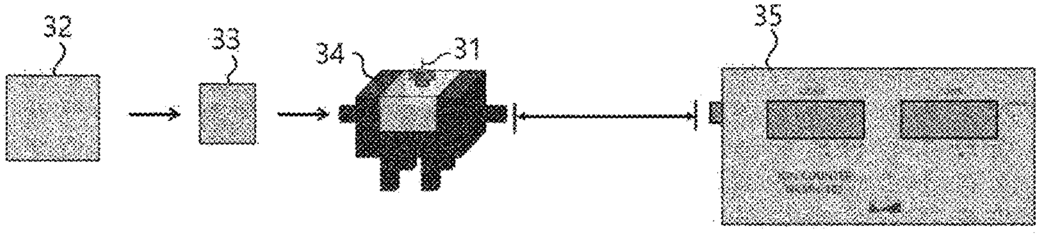
FIG. 19 is an exemplary diagram illustrating an anion concentration evaluation device for measuring an anion generation concentration of the electrodes manufactured in Examples 1 to 5 and the electrode prepared in Comparative Example 1.

Experimental Example 2. Evaluation of Anion Generation Concentration of Electrode By using the anion concentration evaluation device of FIG. 19, anion generation concentrations of the electrodes manufactured in Examples 1 to 5 and the electrode prepared in Comparative Example 1 were evaluated. Specifically, as shown in FIG. 19, anions were generated by placing the electrodes 31 manufactured in Examples 1 to 5 and the electrode 31 prepared in Comparative Example 1 in an anion generator 34, supplying air from an air supply part 32 to the anion generator 34 at a flow rate of 5 L/min using a flow rate adjustment part 33, and applying a DC negative voltage of 7 kV to the electrodes manufactured in Examples 1 to 5 and the electrode prepared in Comparative Example 1. Thereafter, concentrations of the anions generated from the anion generator 34 were measured in an anion measurement part 35 which was installed at a distance of 3.5 cm from the anion generator 34 and used an air ion meter (NKMH-103, Meiko, Japan), and the results were shown in FIG. 20. In this case, an applied electric field intensity may be 200,000 V/m.

Figure 20:
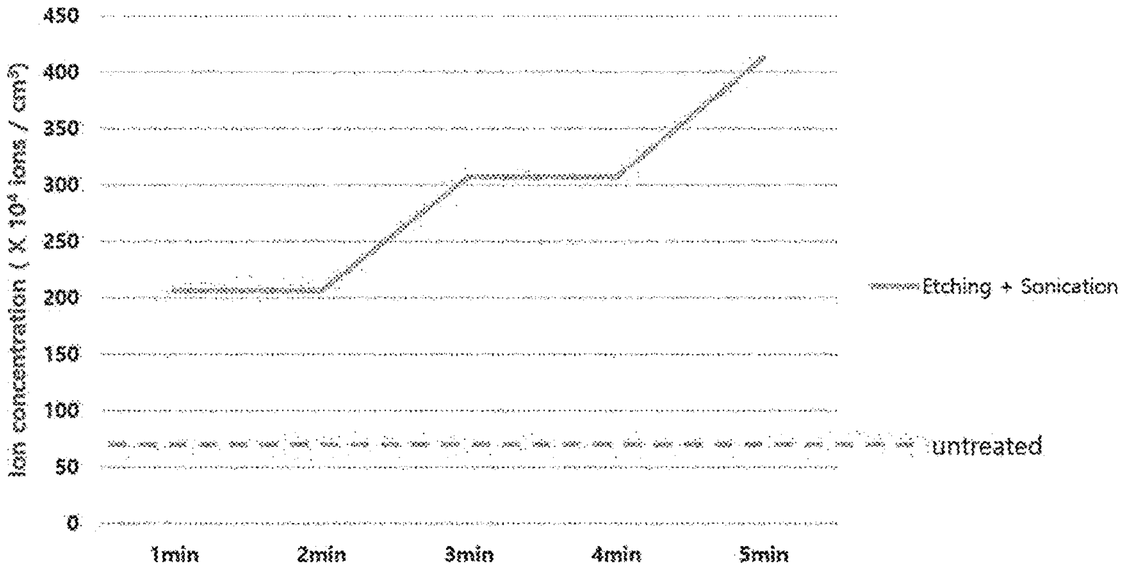
FIG. 20 is a graph showing anion concentrations of the electrodes manufactured in Examples 1 to 5 and the electrode prepared in Comparative Example 1.

As shown in FIG. 20, it was confirmed that the concentrations of the anions generated from the electrodes manufactured in Examples 1 to 5 were superior to the concentration of the anions generated from the electrode prepared in Comparative Example 1. In particular, it was confirmed that the concentration of the anions generated from the electrode manufactured in Example 5 was $42\times10^5$ ions/$cm^3$ which was more than seven times superior to the concentration of the anions generated from the electrode prepared in Comparative Example 1.

Experimental Example 3. Evaluation of Ionization Discharge Onset Voltage According to Radius Curvature of First Protrusion Ionization discharge onset voltages according to radius curvatures of the first protrusions of the electrodes manufactured in Examples 1 to 5 and a radius curvature of an upper end of a body of the electrode prepared in Comparative Example 1 were calculated using the following general equation 1, and the results were shown in FIG. 21. Since the electrode prepared in Comparative Example 1 did not include the first protrusions, the radius curvature of a pointed portion at an upper end of the body was used.

$$V_s = \frac{r}{2} \times E \times \ln\left[\frac{r+2d}{r}\right] \quad \text{[General Equation 1]}$$

In General Equation 1, r denotes the radius curvature of the first protrusion, E denotes an electric field strength when ionization begins to appear on the surfaces of the body and the first protrusion to generate anions, and d denotes a distance between the electrode and a ground.

Figure 21:
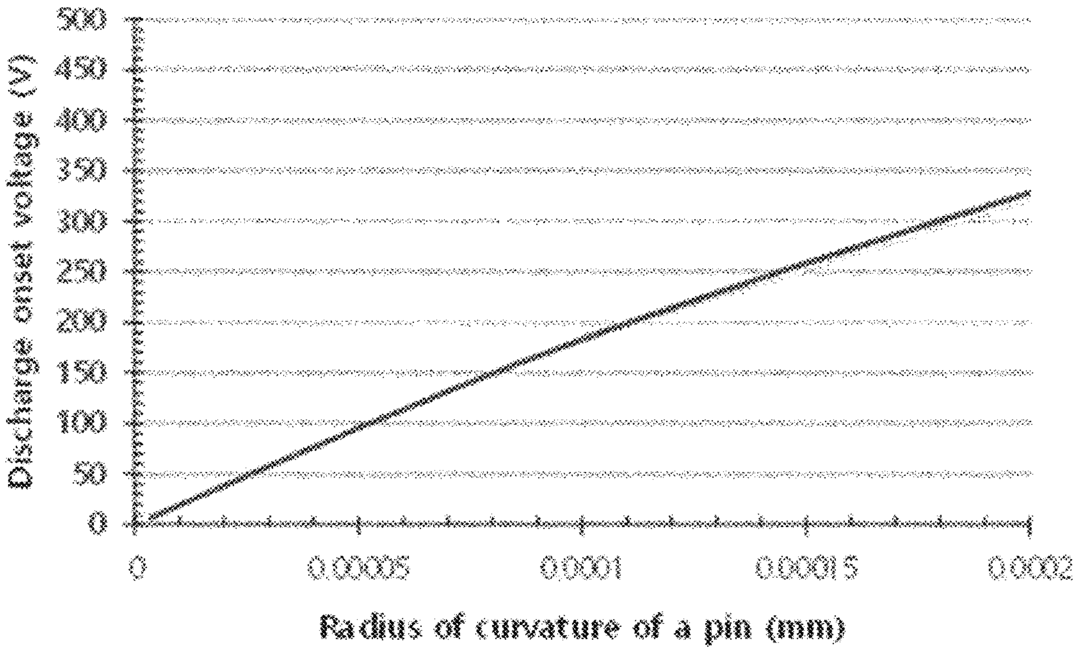
FIG. 21 is a graph showing an ionization discharge onset voltage according to radius curvatures of the first protrusions of the electrodes manufactured in Examples 1 to 5 and the electrode prepared in Comparative Example 1.

As shown in FIG. 21, it was confirmed that the smaller the radius curvature of the first protrusion, the lower the ionization discharge onset voltage for anion generation. Therefore, it was confirmed that the smaller the radius curvature of the first protrusion included in the electrode, the lower the electric field intensity, thereby suppressing ozone production.

Figure 23:
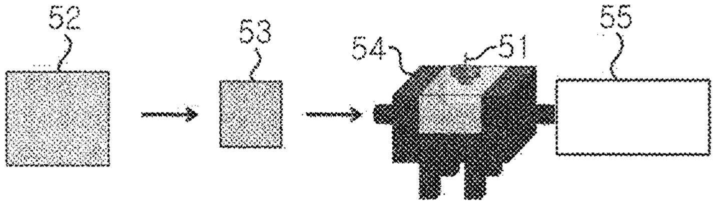
FIG. 23 is an exemplary diagram illustrating a residual ozone concentration evaluation device for measuring residual ozone concentrations according to the electrodes manufactured in Examples 1 to 5 and the electrode prepared in Comparative Example 1.

Experimental Example 4. Evaluation of Residual Ozone Concentration According to Anion Generation from Electrode By using a residual ozone concentration evaluation device of FIG. 23, residual ozone concentrations of the electrodes manufactured in Examples 1 to 5 and the electrode prepared in Comparative Example 1 were evaluated. Specifically, as shown in FIG. 23, the residual ozone concentration evaluation device was designed the same as the anion concentration evaluation device, except that an ozone measurement part 55, which included a sampling probe of an inhalation ozone monitor instead of the anion measurement part 35 in the anion concentration evaluation device shown in FIG. 19, was installed to be connected to the anion generator 54 and measured a residual ozone concentration by measuring the ozone present in some of the air within the anion generator 54.

As a result, it was confirmed that the residual ozone concentrations according to the electrodes manufactured in Examples 1 to 5 were lower than the residual ozone concentration according to the electrode prepared in Comparative Example 1. In particular, it was confirmed that the residual ozone concentration of the electrode manufactured in Example 5 compared to the electrode prepared in Comparative Example 1 was 70 ppb and was significantly lower than the residual ozone concentration of 130 ppb of the electrode prepared in Comparative Example 1.

DESCRIPTION OF REFERENCE NUMERALS

1: solution in which conductive metal particles are dispersed
11: body
12: first protrusion
13: second protrusion
21, 31, 51: electrodes
22: beaker
32, 52: air supply parts
33, 53: flow rate adjustment parts
34, 54: anion generators
35: anion measurement part
55: ozone measurement part

The invention claimed is:

1. An electrode comprising:
a body;
a plurality of nano-sized first protrusions formed on a surface of the body, and
second protrusions formed between the plurality of first protrusions formed on the surface of the body,
wherein the plurality of first protrusions are integrated with the body,
wherein the second protrusions are attached to the body,
wherein the first protrusion includes a transition metal selected from the group consisting of: iron, tungsten, silver, copper, gold, nickel, cobalt, zinc, molybdenum, and an alloy thereof,
wherein the first protrusion has a radius curvature ranging from 1 nm to 10 μm,
wherein the second protrusions are made of nano-sized conductive metal particles,
wherein an anion generation concentration measured by applying a DC negative voltage of 7 kV while supplying air at a flow rate of 5 L/min is $15\times10^5$ ions/$cm^3$ or more.

2. The electrode of claim 1, wherein the anion generation concentration measured by applying the DC negative voltage of 7 kV while supplying air at the flow rate of 5 L/min ranges from $15\times10^5$ ions/$cm^3$ to $1\times10^8$ ions/$cm^3$.

3. The electrode of claim 1, wherein, when anions are generated, a residual ozone concentration is less than 70 ppb.

4. The electrode of claim 1, wherein an electric field applied when anions are generated ranges from 500 V/m to 500000 V/m.

5. The electrode of claim 1, wherein the body includes a transition metal selected from the group consisting of: iron, tungsten, silver, copper, gold, nickel, cobalt, zinc, molybdenum, and an alloy thereof.

6. The electrode of claim 1, wherein the body has a pin shape.

7. A method of manufacturing the electrode according to claim 1, comprising:
a first forming operation of forming a plurality of nano-sized first protrusions on the surface of the body, and
after the first forming operation, a second forming operation of forming second protrusions between the plurality of first protrusions formed on the surface of the body,
wherein an anion generation concentration measured by applying a DC negative voltage of 7 kV while supplying air at a flow rate of 5 L/min is $15\times10^5$ ions/$cm^3$ or more.

8. The method of claim 7, wherein the first forming operation is performed through etching.

9. The method of claim 8, wherein the etching is performed by one or more selected from wet etching, optical etching, and physical etching.

10. The method of claim 9, wherein the wet etching is performed by impregnating the body with an etching solution and then applying ultrasound.

11. The method of claim 10, wherein an application time of the ultrasound ranges from 10 seconds to one hour.

12. An electrostatic discharge system comprising the electrode according to claim 1.

* * * * *